(12) United States Patent
Sherry (10) Patent No.: US 7,963,459 B1
(45) Date of Patent: Jun. 21, 2011

(54) SELF-CLEANING HIGH PRESSURE NOZZLE

(76) Inventor: Raymond C. Sherry, Cleburne, TX (US)

( * ) Notice: Subject to any disclaimer, the term of this patent is extended or adjusted under 35 U.S.C. 154(b) by 0 days.

(21) Appl. No.: 12/156,216

(22) Filed: May 31, 2008

Related U.S. Application Data (60) Provisional application No. 60/932,752, filed on Jun. 1, 2007.

(51) Int. Cl.
*B05B 17/04* (2006.01)
(52) U.S. Cl. ............ 239/13; 239/11; 239/106; 239/114; 239/123; 239/533.1; 239/135; 239/453; 239/533.7; 239/584; 239/585.1; 141/116
(58) Field of Classification Search .............. 239/1, 11, 239/13, 104, 106, 114–118, 123, 102.1, 102.2, 239/128, 135, 451–453, 533.7, 533.9, 584, 239/585.1, 533.1; 251/129.11, 129.12, 129.2; 137/242–244; 141/116
See application file for complete search history.

(56) References Cited

U.S. PATENT DOCUMENTS

| | | | |
|---|---|---|---|
| 3,488,925 A | 1/1970 | Arbogast | |
| 3,930,960 A | 1/1976 | Taylor | |
| 3,998,427 A | 12/1976 | Bentley | |
| 4,044,945 A | 8/1977 | Kohlstette et al. | |
| 4,059,228 A | 11/1977 | Werner | |
| 4,099,703 A | 7/1978 | Lush | |
| 4,172,559 A | 10/1979 | Allenbaugh, Jr. | |
| 4,177,825 A | 12/1979 | Crawford | |
| 4,186,877 A | 2/1980 | Wilcox et al. | |
| 4,234,010 A | 11/1980 | Jenkins et al. | |
| 4,236,547 A | 12/1980 | Harasewych | |
| 4,289,277 A | 9/1981 | Allenbaugh | |
| 4,338,961 A | 7/1982 | Karpenko | |
| 4,346,728 A | 8/1982 | Sulzer | |
| 4,350,301 A * | 9/1982 | Erwin et al. | 239/453 |
| 4,360,037 A | 11/1982 | Kendall | |
| 4,383,645 A | 5/1983 | Figiel et al. | |
| 4,460,009 A | 7/1984 | Nanci et al. | |
| 4,465,091 A | 8/1984 | Keller | |
| 4,469,279 A | 9/1984 | Allenbaugh, Jr. | |
| 4,559,980 A | 12/1985 | Giusti | |
| 4,570,853 A | 2/1986 | Schmied | |
| 4,619,400 A * | 10/1986 | van der Burgt | 239/102.1 |
| 4,627,461 A | 12/1986 | Gordon | |
| 4,648,421 A * | 3/1987 | Chant et al. | 141/116 |
| 4,719,938 A | 1/1988 | Pandorf | |
| 4,745,944 A | 5/1988 | Francart, Jr. | |
| 4,938,876 A | 7/1990 | Ohsol | |

(Continued)

OTHER PUBLICATIONS

Liquid Sampling Valve, Manual or Automated—HS31, 1-page Internet printout, 2007.

*Primary Examiner* — Steven J Ganey
(74) *Attorney, Agent, or Firm* — Roger N. Chauza (57) ABSTRACT

An expansion nozzle adapted for use in high pressure, high temperature conditions. The expansion nozzle uses spring compression to operate under constant pressure conditions to efficiently flash hot water into steam. A motor can be employed to automatically adjust the extent of compression of the spring during the flashing operation, to thereby adjust the pressure of the liquid applied to the nozzle. In addition, the expansion nozzle can be equipped with a mechanism to allow cleaning or lapping of the orifice surfaces without disassembly of the expansion nozzle assembly.

25 Claims, 7 Drawing Sheets

U.S. PATENT DOCUMENTS

| | | |
|---|---|---|
| 4,953,694 A | 9/1990 | Hayashi et al. |
| 4,964,574 A | 10/1990 | Daigle |
| 5,002,088 A | 3/1991 | Engelhardt et al. |
| 5,044,555 A | 9/1991 | Youngeberg et al. |
| 5,110,418 A | 5/1992 | Garrison et al. |
| 5,137,050 A | 8/1992 | Clarke et al. |
| 5,234,031 A | 8/1993 | Pickett et al. |
| 5,357,995 A | 10/1994 | King et al. |
| 5,590,719 A | 1/1997 | McLoughlin et al. |
| 5,955,135 A | 9/1999 | Boucher et al. |
| 5,968,312 A | 10/1999 | Sephton |
| 5,971,889 A | 10/1999 | Ohashi et al. |
| 5,984,148 A | 11/1999 | Andel et al. |
| 6,119,716 A | 9/2000 | Wright |
| 6,273,121 B1 | 8/2001 | Goni Usabiaga |
| 6,345,771 B1 * | 2/2002 | Gromek et al. ............ 239/5 |
| 6,446,660 B1 | 9/2002 | Goni Usabiaga |
| 6,832,595 B2 | 12/2004 | Klein et al. |
| 7,051,756 B2 | 5/2006 | Seitz |
| 7,128,084 B2 | 10/2006 | Long et al. |
| 7,422,166 B2 * | 9/2008 | Hoffmann et al. ......... 239/533.7 |
| 7,546,961 B2 * | 6/2009 | Cristiani et al. .......... 239/533.7 |
| 7,581,686 B2 * | 9/2009 | Holzgrefe et al. ........ 239/533.7 |

* cited by examiner

SELF-CLEANING HIGH PRESSURE NOZZLE

RELATED APPLICATIONS

This non-provisional patent application claims the benefit of pending U.S. Provisional Application No. 60/932,752, filed Jun. 1, 2007. This patent application is also related to non-provisional patent application Ser. No. 12/156,217 filed of even date herewith, by Raymond C. Sherry, and entitled "Method and Apparatus for Purifying Water."

TECHNICAL FIELD OF THE INVENTION

The present invention relates in general to liquid nozzles, and more particularly relates to high pressure liquid nozzles that are of the self cleaning type.

BACKGROUND OF THE INVENTION

The use of a nozzle is necessary in many pressurized systems that process liquids. Nozzles are especially useful, and indeed often necessary, in systems where high pressure, hot water is flashed into steam and then condensed to produce a more purified form of water. Sea water, gas and oil well production water, and other forms of water are processed in this manner to remove many of the contaminants and produce a more usable form of water.

Water purification systems employing evaporation or distillation principles often use a pump to pressurize the raw water, and a heater to heat the water to a high temperature. The heated water is then processed through a nozzle in an expansion chamber where the hot water flashes into steam. The portion of the heated water that does not flash into steam is removed, and the steam is carried to a condensation unit where it is condensed into the more purified form of water.

There are many sophisticated water purification systems that process large quantities of water through complicated processes to obtain pure water. Because of the complexity, the systems represent a substantial capital expenditure, and are often operated on a continuous basis in order to produce the desired amount of pure water. As such, it is imperative that the system and the components thereof perform reliably so that maintenance and repair is kept to a minimum. One component of such type of system that requires routine maintenance is the nozzle that transforms the high pressure, hot water into droplets that are flashed into steam in the expansion chamber. The dirtier the water that is processed, the more often the nozzle requires maintenance to remove deposits formed in the orifices, or to remove particulate matter that is too large to pass through the orifices. Often, filtration of the raw water is desirable to remove some of the particulate matter, however, the flash expansion process itself can form calcified deposits where they did not exist before in the stream of raw water. It can be appreciated that the system operation must be temporarily halted in order to replace the nozzle or otherwise remove the residue and deposits in the nozzle orifices. Because of the constant problem of nozzle failure, many water purification systems require regular monitoring to assure that the system is operating satisfactorily. In systems that process dirtier forms of water, and toxic water, the systems must be attended by an operator to provide continuous monitoring of system operation. This increases the overall operational cost of the system as well as the resulting product.

Evaporation nozzles heretofore known in the field can be constructed with no moving parts to increase the reliability and reduce the cost of the system. See for example, U.S. Pat. Nos. 3,930,960 by Taylor; 4,953,694 by Hayashi et al.; and 5,955,135 by Boucher et al. These types of nozzles simply pass the pressurized water through an opening or orifice to create a mist that flashes into steam when exposed to a reduced-pressure environment. As noted above, the orifices can become clogged or become less effective due to residue buildup on the orifice areas. Moreover, since these simple nozzles have no moving parts, they are not capable of responding to changes in the various parameters of the liquid being processed to change the operating conditions of the system.

In the flash expansion systems of the type that heat the raw water to a high temperature, and pressurize the water with a pump, it is necessary to maintain the pressure of the heated water under control so that inadvertent flashing of the heated raw water does not prematurely occur in the system, other than at the expansion nozzle. Such an occurrence presents a corrosive condition to the system apparatus, thus severely shortening the life of the components. Thus, the pressure of the heated raw water must be monitored, and if changes are noted, such as a lowered pressure, then a control system must be responsive to such change and increase the speed of the pump or otherwise change other system parameters to restore the water pressure to the desired value. While this pressure control is certainly possible, and often necessary, the added components complicate the system and make it more costly. It would be desirable if the system could be at least partially controlled in this manner with the nozzle itself to control the orifice and regulate the pressure of the raw, heated water to maintain the same within desired limits so that premature flashing of the hot water does not occur.

From the foregoing, it can be seen that a need exists for an improved nozzle that is responsive to changes in various parameters of the liquid being processed to change the operating conditions of the system. Another need exits for a nozzle that is self cleaning and effective to pass particulate matter that is large enough to clog the orifice. Yet another need exists for a nozzle that is actuated to perform a cleaning routine that laps the surface areas of the orifice to remove deposits thereon. Still another need exists for a nozzle adapted for allowing a stem to be rotated during dynamic operation of the nozzle to thereby grind particulate matter lodged in the orifice. Another need exists for a nozzle structure that is designed to operate for long periods of time while processing dirty, particulate-laden liquids, and in harsh high temperature, high pressure environments. A further need exists for a nozzle that is processor-controlled to provide nozzle orifice adjustments automatically and remotely, as well as provide lapping of the orifice surfaces.

SUMMARY OF THE INVENTION

In accordance with the principles and concepts of the invention, disclosed is an expansion nozzle having a stem or plunger movable to define an orifice with respect to a seat. According to an important feature of the invention, the stem is spring biased to a closed position within a body of the nozzle. When employed with a liquid processing system having a positive displacement pump, changing parameters of the liquid that would otherwise cause pressure variation in the system are automatically counteracted by the nozzle to maintain the pressure in the system at a desired value.

According to another feature of the invention, the spring biased stem of the nozzle is ideally adapted for use in a water purification system of the type where the heated hot water must be maintained at or above a desired value so that premature flashing of the hot water does not occur in the system, except at the nozzle.

According to yet another embodiment of the invention, disclosed is a nozzle having a spring biased stem, and means for rotating the stem to lap a seat to remove accumulated deposits therefrom.

With respect to another feature of the invention, disclosed is a nozzle with a stem that is spring biased and movable during dynamic operation to define an orifice, but which can be rotatable during operation to maintain the orifice clear of particulate matter.

In accordance with one embodiment of the invention, disclosed is a variable orifice nozzle for use with a pressurized liquid, where a nozzle body has an inlet into which the pressurized liquid is admitted, and an outlet opening through which the pressurized liquid exits. A stem is movable to form an orifice in the nozzle, and a spring biases the stem to a position closing the orifice. A force that is exerted by the spring on the stem and a pressure of the liquid to which the nozzle is subjected defines an orifice area during dynamic operation of the nozzle. An electrical drive mechanism is adapted for applying a desired compression force to the spring.

According to another embodiment of the invention, disclosed is a variable orifice nozzle for use with a pressurized liquid. Included is a nozzle body having an inlet into which the pressurized liquid is admitted, and an outlet opening through which the pressurized liquid exits. A stem has a member attached thereto, where the member is movable to form a variable area orifice with the outlet opening of the nozzle body. The stem further includes a threaded portion. A spring biases the stem to a position closing the orifice, and a force exerted by the spring on the stem defines the orifice area during dynamic operation of the nozzle. An idler gear engages one end of the spring and is movable to apply a desired force to the spring. The idler gear has a threaded bore mating with the threaded portion of the stem. The idler gear also has teeth formed thereon. A lock mechanism is movable into and out of engagement with the teeth of the idler gear. A first electrical drive mechanism rotates the stem, and a second electrical drive mechanism moves the lock mechanism.

With regard to yet another embodiment of the invention, disclosed is a method of processing a pressurized liquid. The method includes the step of pumping a heated liquid through a liquid processing system, where the temperature of the liquid is sufficient to flash the heated liquid when passed through a nozzle assembly. A nozzle is used in the nozzle assembly having a spring biased member that forms an orifice, where a compression force of the spring defines the pressure at which the heated liquid is pumped through the orifice of the nozzle. The liquid pressure in the liquid processing system is sensed by a control system, and an electrical signal is transmitted to the nozzle assembly to change the compression force of the spring and thus change the pressure by which the liquid is pumped in the liquid processing system.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
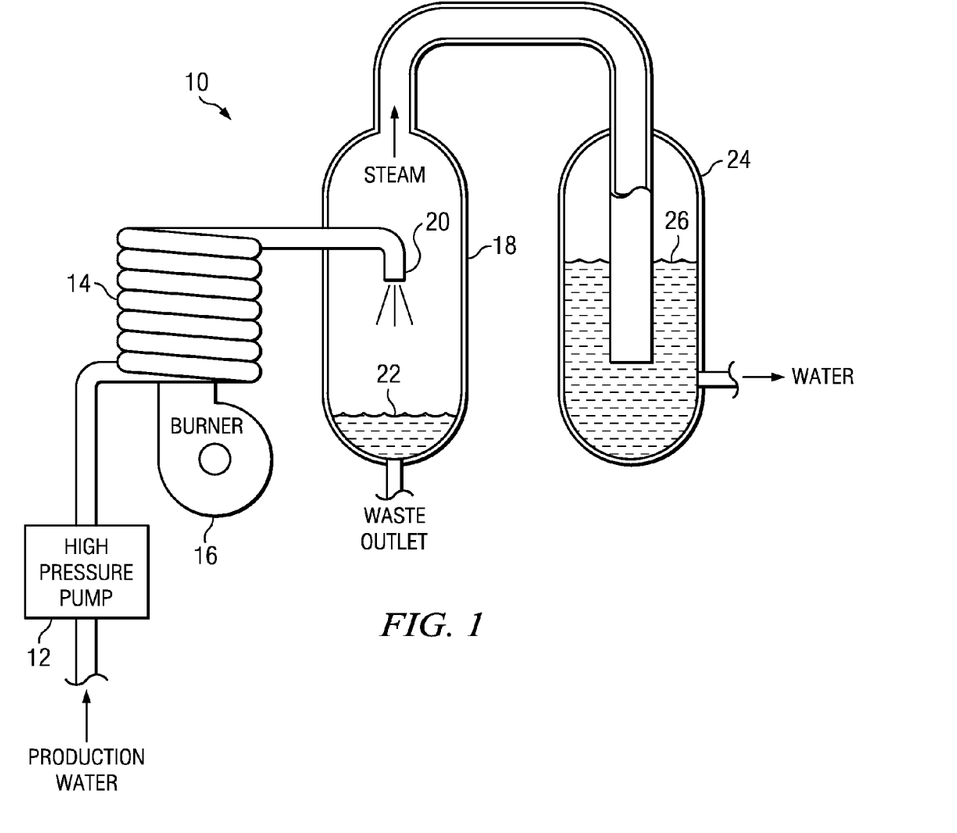
FIG. 1 is a diagram of a water purification system in which the invention can be advantageously practiced.

With reference to FIG. 1, there is shown an environment 10 in which the invention can be advantageously practiced. One application of the invention involves the processing of production water from a gas well to provide purified water that is environmentally safe for human consumption, or for returning to the ground via lakes, rivers, streams, or for agricultural irrigation purposes. The water purification system is shown in rudimentary form in FIG. 1, but is described in detail in pending patent application entitled "Method and Apparatus for Purifying Water," by Raymond C. Sherry, filed May 31, 2008, and assigned Ser. No. 12/156,217.

The production water that is generated during extraction of gas from a well is coupled to a high pressure positive displacement pump 12, which is preferably capable of pumping the production water at pressures as high as 5,000 psi, and preferably about 2,000 psi to 3,500 psi. In the preferred form of the invention, the pump 12 is driven by an engine at about 800 rpm to produce pressurized liquids at a constant rate of about nine gallons per minute. The pressurized production water is pumped through a helical coil 14 which is heated by a high efficiency burner 16. The burner 16 is preferably capable of heating the production water flowing through the helical coil 14 to temperatures between about 500 and 700 degrees F., and preferably 600 degrees F. Under these conditions, the production water remains in the liquid state in the system. The high pressure, high temperature production water is then coupled to an expansion chamber 18 employing an expansion nozzle 20.

Expansion nozzles are frequently employed to flash high pressure, high temperature liquids into steam so that evaporation can occur. Where production water from a petroleum well is processed, many liquid, solid and gas impurities are carried with the water and thus must be processed to remove the same. As such, the processing system must be capable of processing the impurities with the water without disruption or undue deterioration of the components of the system. One component that is susceptible to clogging and operational failure in water purification systems employing evaporation and condensation techniques, is the expansion nozzle. In such systems, the nozzles are frequently clogged by debris that forms during the expansion of the high temperature, high pressure liquid while being transformed from the liquid phase to the gas or steam phase.

In the embodiment of the invention described herein, the production water of a gas well is processed to remove impurities and provide a water product that is purified and is environmentally safe. It should be understood that the expansion nozzles of the invention can find applications in many other fields. In any event, the production water is sprayed by the nozzle 20 into the expansion chamber 12 at a constant volumetric rate, and under conditions so that the pressurized water is converted to steam. The conditions in the expansion chamber are such that the pressure is about 50 psi and the temperature is in the neighborhood of about 212-240 degrees F. Other expansion chamber conditions can be employed. The particulate matter 22, and other liquid impurities resulting from the flash operation settle to the bottom of the expansion chamber 18 and can be periodically removed. Importantly, these impurities are passed through the expansion nozzle 20 and must not interrupt proper operation of the nozzle 20. The steam is carried to a condenser 24, which may be of the bubbler type, or other type, where the steam is converted to pure water 26. The pure water 26 can be extracted from the condenser 24 and used in any desired manner. This type of technique has been found to be very efficient in processing production water in which the often toxic and undesirable byproducts are removed therefrom.

The expansion nozzle 20 is subject to extreme high temperature and high pressure conditions and thus must be durable and free from clogging and other troubles. Otherwise, the system must be interrupted so that the nozzle 20 can be removed from the expansion chamber 18 and cleaned or otherwise maintained in an operable condition. The interruption of a water processing system is time consuming and costly, as the system has to be cooled down, partially dismantled, repaired, and then started up in an incremental manner until all subsystems resume operating conditions. It can be appreciated that when flashing steam from the high temperature, high pressure water, the water often has both solid and liquid, organic and inorganic contaminants therein. When the high temperature, high pressure water passes through the orifice of the nozzle, many liquid impurities calcify or otherwise harden and form deposits on the nozzle which reduce the effectiveness thereof.

Figure 2:
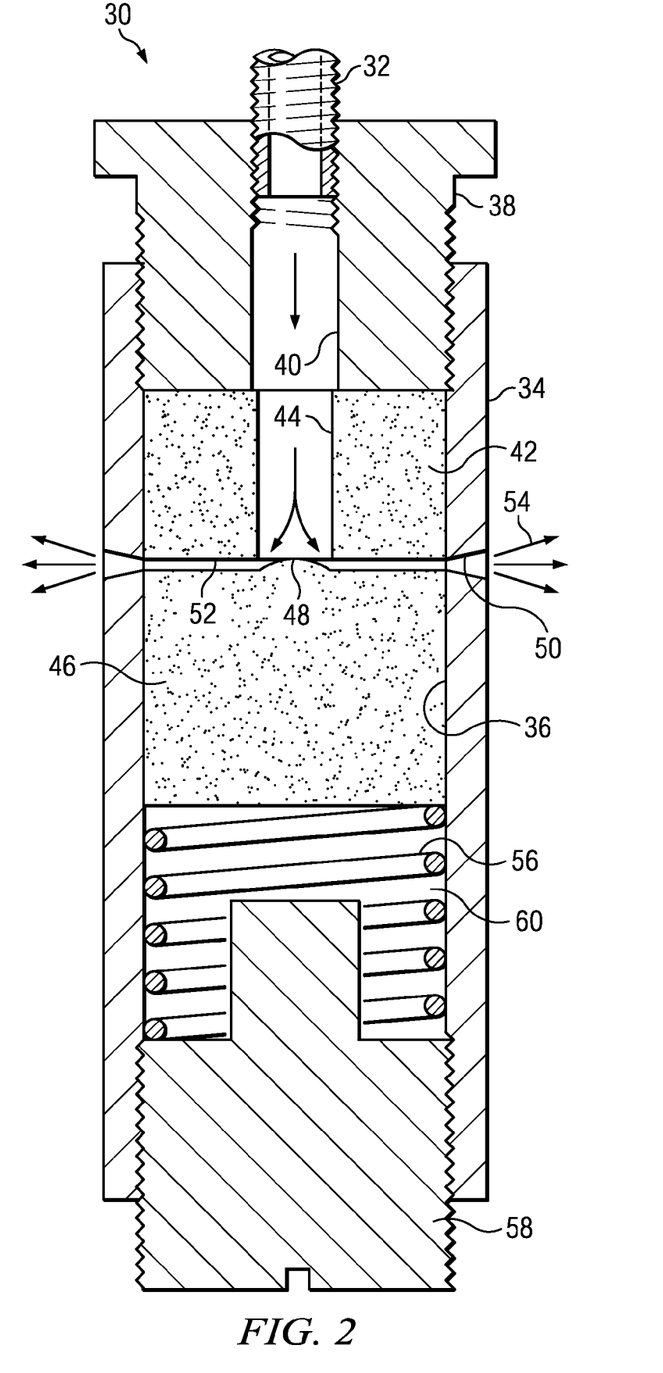
FIG. 2 is a cross-sectional view of an expansion nozzle according to one embodiment of the invention.

FIG. 2 illustrates the details of the expansion nozzle 30 constructed according to one embodiment of the invention. The expansion nozzle 30 is well adapted for operating under isobaric conditions. In other words, it is desired to maintain a constant pressure across the orifice of the expansion nozzle 30. This is preferred as it is desired to maintain the pressure of the hot water in the system sufficiently high to prevent flashing, except when emitted from the nozzle 30. If the pressure of the production water is reduced for some reason, the nozzle 30 closes somewhat to compensate for the pressure change. Conversely, if the pressure of the production water increases, the orifice of the nozzle 30 increases in area, thereby maintaining a constant flow rate as required of the positive displacement pump 12. A stainless steel tube 32 carries the pressurized hot water to the expansion nozzle 30 from the outlet fitting of the helical tubing 14. The expansion nozzle 30 includes a cylindrical body 34 constructed of stainless steel, with an axial length of about ten inches, and a wall thickness of about 0.25 inch. The inner cylindrical surface 36 of the body 34 is polished. The top of the body 34 is internally threaded to receive therein a nipple 38 having a bore 40 therethrough. The top of the bore 40 is threaded to receive the threaded end of the threaded pipe 32. A ceramic tubular member 42 is housed within the inner cylindrical surface 36 of the nozzle body 34. The ceramic member 42 includes a bore 44 axially aligned with the bore 40 of the nipple 38. Situated below the ceramic member 42 is a ceramic stem or plunger 46 which is slideable within the polished inner cylindrical surface 36 of the body 34. The top of the ceramic plunger 46 includes a domed part 48 which protrudes upwardly into the bore 44 of the ceramic member 42. The ceramic plunger 46 is spring biased upwardly in a manner described below.

Formed in the body 34 of the expansion nozzle 30 are plural orifices, one identified by numeral 50. The orifices 50 are cone shaped in a direction radially outwardly. Importantly, the orifices 50 are located in the body 34 just below the bottom surface of the ceramic member 42 so that hot pressurized water forced downwardly through the bores 40 and 44 is directed radially outwardly through the space 52 between the bottom surface of the ceramic member 42 and the top surface of the ceramic plunger 46. The pressurized water exits the orifices 50 in the manner shown by the arrows 54.

According to an important feature of the invention, the ceramic plunger 46 is movable up and down within the body 34 of the expansion nozzle 30. The ceramic plunger 46 is spring biased upwardly by a compression spring 56. The spring 56 is captured between the bottom flat surface of the ceramic plunger 46 and the top flat annular surface of an adjustable plug 58. The adjustable plug 58 is threaded into the bottom of the body 34, and is adjustable axially therewith. While not shown, the adjustable plug 58 can be locked from rotation by a lock nut. The chamber 60 in which the spring 56 operates can be filled with a fluid to provide both dampening of the movement and lubrication of the ceramic plunger 46. The spring 56 forces the ceramic plunger 46 upwardly against the ceramic member 42 when there is no fluid pressure applied to the input of the expansion nozzle 30. When the requisite 3,500 psi hot water is applied to the expansion nozzle 30, the bias of the spring 56 is overcome and the ceramic plunger 46 is forced downwardly just enough to expose the orifices 50 and allow the hot water to exit therefrom into the expansion tank 18. The bottom surface of the ceramic member 46 is flat, and the top surface (except the domed area 48) of the ceramic plunger 46 is flat. The domed top 48 of the ceramic plunger 46 facilitates the redirection of the hot water from a downward direction to a radially outward direction, and reduces turbulence of the high velocity hot water.

As soon as the hot pressurized production water exits the nozzle 30, a mist is formed. As the mist is exposed to the atmospheric pressure within the expansion chamber 18, the droplets of pressurized water flash into steam, as described above. As can be appreciated, with the high pressures used within the processing system, the water that exits the nozzle 30 is dispersed into many, very small droplets of water, which facilitates the evaporation or flashing thereof into steam. According to the principles of evaporation of hot water, with increased surface area, the evaporation is facilitated. The creation of many droplets of water emitted by the nozzle 30, effectively increases the overall surface area, thereby facilitating an efficient evaporation thereof.

The spring tension on the ceramic plunger 46 is adjusted by the adjustable plug 58 so that the vertical space of the passageway 52 is about 0.005 inch when the pressure of the hot water is about 3,500 psi. The orifices 50 are round, and are about 0.030 inch in diameter at the smallest part of the orifice 50. It is expected that there could be about four to six orifices 50 evenly spaced around the body 34 of the expansion nozzle 30. When employing a positive displacement pump operating at a pressure of about 3,500 psi, the flow rate of hot water through the expansion nozzle will be about five gallons per minute, if the water temperature is 600 degrees F. The steam conversion rate is a function of the heat added to the water in the helical coil 14, and not the temperature/flow rate of the water. The various nozzle embodiments described herein are designed to process production water at a rate of about five gallons per minute.

According to an important feature of the invention, the expansion nozzle 30 is self cleaning in the event that a particle obstructs the passage to an orifice, or the orifice itself. If a particle is large enough to become lodged in the passage 52 to the orifice 50, the pressure in the passageway 52 will increase. This is because the positive displacement pump 12 operates at a constant rpm to process a constant volume of production water per unit of time. Thus, if the effective orifice area becomes smaller, due to blockage, the pressure in the system will automatically increase to maintain the given volume of production water per unit time. When a blockage of the orifice 50 results in increased fluid pressure in the nozzle 30, the increased pressure of the hot water will push the ceramic plunger 46 downwardly. The downward movement of the ceramic plunger 46 is effective to enlarge the passage 52, thus allowing the particle to pass through to the closest orifice 50. After passage of the particle through the orifice 50, the water pressure within the expansion nozzle 30 returns to its normal operating state, and the ceramic plunger 46 moves upwardly to its normal operating position. While not shown, respective deflection plates (not shown) can be fixed to the outer surface of the expansion nozzle body 34, above each orifice 50, to deflect the high pressure stream of flashed steam downwardly toward the bottom of the expansion tank 18.

The foregoing illustrates the self-cleaning nature of the nozzle with respect to removal of particulate matter that can clog the orifices 50 of the nozzle 30. To that end, the production water processing system 10 can process water with particulate solids therein without causing clogging of the nozzle 30 and the resulting disruption of the system in cleaning the nozzle, which would otherwise be necessary. As noted above, by employing a positive displacement pump 12, the liquid pressure in the system changes to maintain the given flow rate. Thus, the adjustment of the spring 56 to increase the compression pressure thereof results in an increased pressure of the liquid being processed, without changing the flow rate through the nozzle 30. Importantly, when the pressure of the liquid processed in the system 10 is reduced for any reason, the spring 56 causes the nozzle orifices 50 to close to maintain the system at a given pressure. This is important, as when the production water is heated to a high temperature in the coils 14, a minimum liquid pressure must be maintained in order for the water not to flash when heated in such coils 14. The flashing of any liquid in the coils 14 produces a highly corrosive environment which can rapidly deteriorate the coils and severely reduce the life thereof. In one embodiment of the invention, when the production water is heated in the coils 14 to a temperature of about 600 degrees F., and a liquid pressure of about 3,500 psi is maintained by the proper adjustment of the spring 56 in the nozzle 30, the production water remains in the liquid state until released from the nozzle 30, whereupon the near-atmospheric conditions causes the liquid to disperse into many particles and immediately flash into steam.

It should be understood that the spring-operated nozzle 30 is also effective to maintain or regulate the liquid pressure in the upstream part of the processing system as a result of changing densities of the liquid processed by the system. In other words, if the density of the liquid passing through the nozzle 30 decreases, then the constant spring force will cause the orifice area to be reduced to thereby maintain the system at a given pressure. The density of the liquid processed by the system 10 may change as a result of the temperature of the liquid, the type of liquid, such as when the production water includes petroleum products, when the liquid has gas particles therein, etc. Thus, the nozzle 30 is well adapted for reliably processing the production water which generally has particles and many other impurities that would otherwise cause many processing inefficiencies. The other nozzle embodiments described below are constructed to provide the same advantages as the nozzle 30, and additional advantages.

Figure 3:
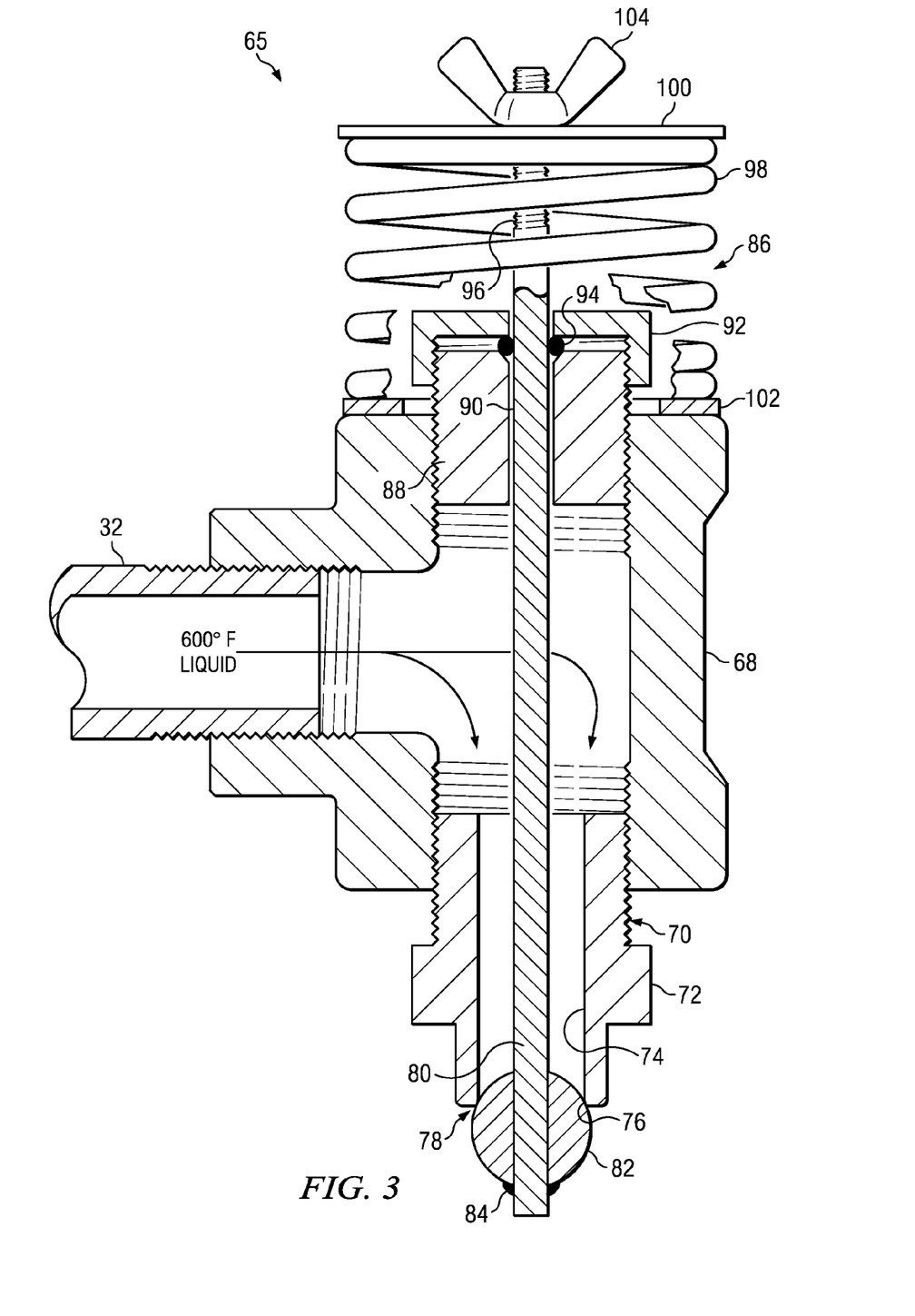
FIG. 3 is another embodiment of an expansion nozzle according to the invention.

FIG. 3 is another embodiment of an expansion nozzle 65 according to the invention. The stainless steel tube 32 carries high pressure, thigh temperature production water to the expansion nozzle 65. The tube 32 is threaded into a stainless steel "T" 68 of conventional design. The nozzle apparatus is situated at the bottom of the T 68, and the adjustment apparatus is situated at the top of the T 68. The nozzle apparatus includes a fitting 70 that is threaded into the bottom opening of the T 68. The threaded fitting 70 is typically a stainless steel fitting welded to a stainless steel pipe to mate the pipe to a threaded hole. The fitting 70 is formed with a hex-shaped wrench collar 72. The fitting 70 includes a bore 74 therethrough that opens to an annular edge or seat 76 that forms an annular orifice 78. The annular edge 76 can be chamfered or beveled, if desired.

The expansion nozzle 65 includes a stem 80 to which is welded a ceramic ball 82. The weld is shown as numeral 84. The ceramic ball 82 is larger than the bore 74 of the fitting 70 and thus circumferentially engages with the annular edge 76 of the fitting 70. When the stem 80 moves downwardly, the ceramic ball 82 move downwardly in a corresponding manner and forms a space or orifice 78 with the annular edge 76 of the fitting 70. The ceramic material of the ball 82 is well adapted for use in the high temperature and high pressure conditions noted above. In practice, the ceramic ball 82 has a bore therethrough through which the end of the stem 80 extends. The lower end of the ceramic ball 82 can thus be welded to the stub end of the stem 80.

The stem 80, and thus the ceramic ball 82, is adjustable by way of an adjustment mechanism 86. The adjustment mechanism 86 includes a stainless steel plug 88 that is threaded into the top of the T 68. The plug 88 is formed with a bore 90 centrally therein and through which the stem 80 extends. An apertured cap 92 is threaded onto the top end of the plug 88. The aperture in the cap 92 allows the stem 80 to extend therethrough. A seal is formed between the plug 88 and the stem 80 using a suitable packing 94 which is squeezed tightly around the stem 80. The packing 94 is squeezed to form the seal by means of the cap 92 being screwed onto the plug 88 sufficiently tight so that the packing 94 forms a seal to prevent the pressurized production water from escaping from the expansion nozzle 65, except through the orifice 78 at the lower end of the nozzle 65.

The top end of the stem 80 has threads 96. A compression spring 98 is captured between a top washer 100 and a bottom washer 102. A thumb screw 104 is threaded onto the top of the stem 80 and rotated to adjust the compression of the spring 98 and thereby apply a preset compression to the spring 98. The constant force produced by the compression of the spring 98 is effective to maintain a constant production water pressure. During static conditions, the upward force on the stem 80 holds the ceramic ball 82 engaged against the annular edge 76 of the fitting 70. In the static condition of the expansion nozzle 65, the orifice area is effectively zero, as the ceramic ball 82 is held against the annular edge 76 of the fitting 70. The spring 98 is constructed of an alloyed steel material to withstand the high temperatures to which the expansion nozzle 65 is subjected. Preferably, the spring 98 is selected to exhibit a linear force over the normal range of compression to provide the desired range of orifice sizes. The preset compression force applied by the spring 98 to the stem 80 can be adjusted to different values by the thumb screw 104.

In operation, the high temperature, high pressure production water is applied to the nozzle 65 by the tubing 32. The pressure of the hot production water, in the neighborhood of 2,000 psi in one preferred embodiment, is sufficient to overcome the force of the spring 98, whereby the stem 80 is forced downwardly against the force of the spring 98. This movement of the stem 80, and thus the ceramic ball 82, is effective to move the ball 82 away from the annular edge 76 of the fitting 70 to thereby form an annular orifice 78. The ceramic ball 82 is moved away from the annular edge 76 of the fitting 70 by a distance such that the force exerted internally in the expansion nozzle 65 by the pressurized production water is equal to the upward force exerted by the spring 98 on the stem 80 and ceramic ball 82. This equilibrium is maintained as long as the pressure of the production water remains the same, which is desired in the preferred embodiment of the invention.

As noted above, the size of the orifice 78 can be manually adjusted by adjustment of the thumbscrew 104. By tightening the thumb screw 104 on the threaded end of the stem 80, the orifice 78 is made smaller, and the pressure of the production water increases to maintain the same flow rate of liquid through the nozzle 65. In contrast, when the thumb screw 104 is loosened on the stem 80, the orifice 78 is effectively made larger, which reduces the system pressure to maintain the same flow rate of liquid through the expansion valve 65. In practice, the size of the orifice 78 is adjusted to provide a desired liquid pressure in the system 10 so that flashing of the liquid in the heating coils 14 is prevented. This condition also achieves optimum flashing of the hot production water into steam. In the embodiment of FIG. 3, the entire expansion valve is inside the expansion chamber 18 and thus the adjustment thereof cannot be accomplished during dynamic operation of the system. Much like the expansion nozzle 30 of FIG. 2, the expansion nozzle 65 of FIG. 3 is self cleaning, in that any particle or other matter that becomes lodged in the orifice effectively reduces the area of the orifice 78 and thereby increases the pressure within the expansion nozzle 65. This operation of the nozzle 65 is also achieved when the orifice areas accumulate residue thereon, or when the orifice surfaces become worn due to extended use. In response to a reduced orifice area, the increased liquid pressure forces the stem 80 downwardly somewhat to again equalize the forces between the internal liquid pressure within the expansion nozzle 65 and the force exerted by the spring 98. The downward movement of the stem 80 increases the orifice size which may be sufficient to allow the particle to pass through the orifice 78. In this event, the stem 80 will move upwardly until the noted forces again reach equilibrium. If the operation of the water purification system indicates that the particle clogging the orifice is not removed automatically in the manner noted, then it is possible to increase the pressure of the production water upwardly to 5,000 psi to break the particle and force the pieces of the particle through the orifice 78.

Figure 4:
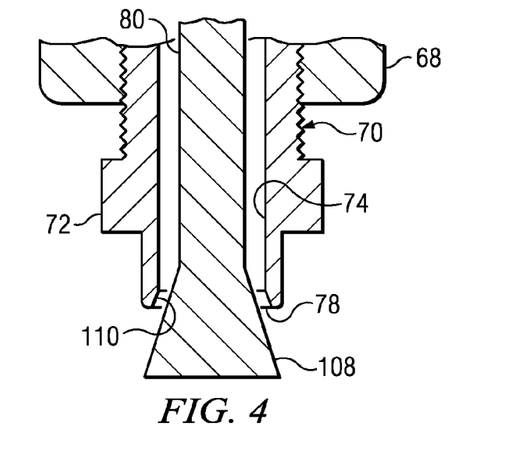
FIG. 4 is an alternate arrangement of a nozzle that can be employed in the expansion nozzle of FIG. 3.

FIG. 4 illustrates another arrangement for defining an orifice 78 in the expansion nozzle 65. Here, instead of employing a ball 82, a tapered ceramic member 108 is welded or otherwise formed on the bottom end of the stem 80. The conical surface of the ceramic member 108 seats with a corresponding tapered annular edge 110 of the fitting 70. The nozzle arrangement otherwise functions in the same manner as that described above in connection with the expansion nozzle 65 of FIG. 3.

Figure 5:
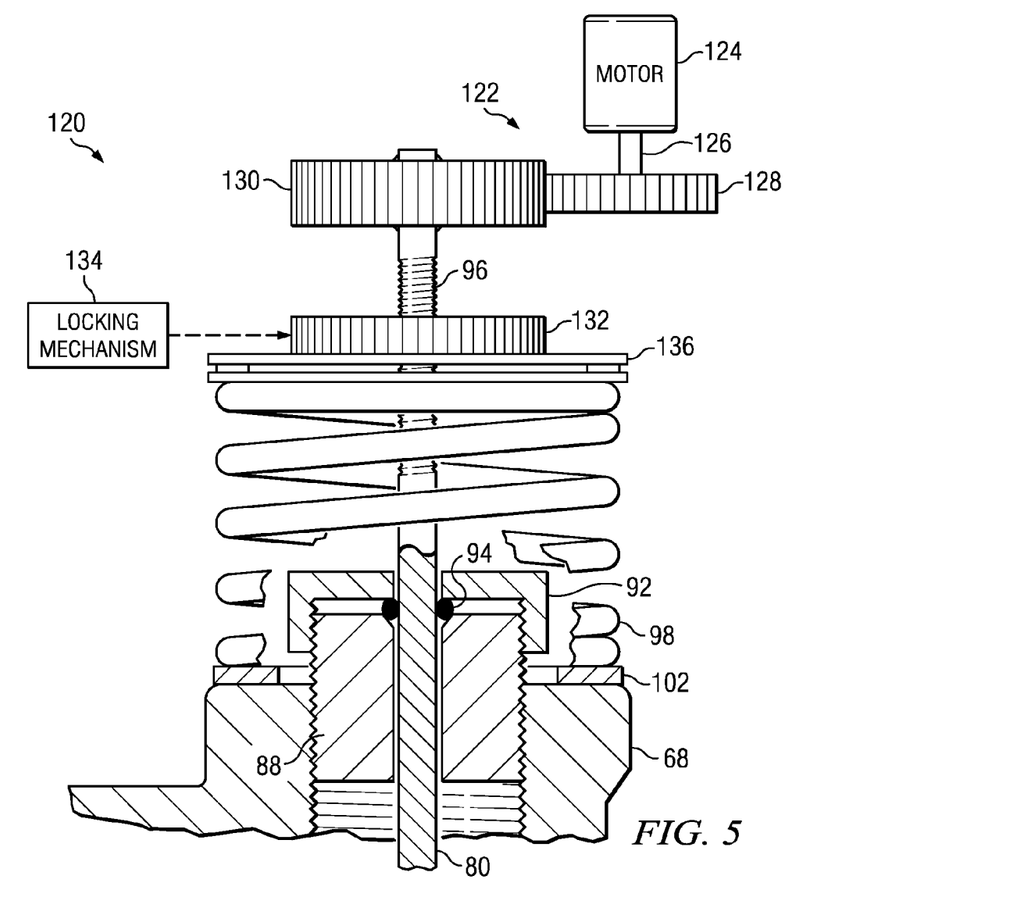
FIG. 5 is an embodiment of an expansion nozzle equipped with mechanized orifice adjustment apparatus.

FIG. 5 illustrates an expansion nozzle 120 equipped with a motorized adjustment mechanism 122. Rather than being manually adjustable, the expansion nozzle 120 is adjusted by energizing a DC motor 124 in one direction to increase the pressure of the production water in the system 10, and in the other direction to decrease the pressure. As noted above, the position of the stem 80 is dynamic during operation of the system 10, to maintain the pressure of the liquid processed therethrough essentially the same, irrespective of changes in temperature, density and composition of the liquid. The DC motor 124 and the associated apparatus described below are suitable for operating in the environment found in the expansion chamber 18. The pressure in the expansion chamber 18 is generally about 50 psi, with a temperature in the neighborhood of about 212-240 degrees F.

The DC motor 124 is equipped with a shaft 126 and a gear 128. The motor gear 128 meshes with another gear 130 which is fixed to the top of the nozzle stem 80. Thus, when the motor 124 is energized, the rotation of the motor gear 128 causes rotation of the stem gear 130. Rotation of the stem 80 by the motor 124 may, or may not, cause adjustment of the compression force of the spring 98, it being understood that when the compression force is increased because of rotation of the stem 80, the pressure of the processed liquid increases. The rotation of the stem 80 is effective to cause adjustment of the compression force of the spring 98 if the internally threaded idler gear 132 is maintained stationary. On the other hand, if the idler gear 132 is allowed to rotate with the stem 80, then there is no axial movement of the stem and the compressive state of the spring 98 remains the same. It is to be noted that the compression state of the spring 98 may automatically change during dynamic operation of the nozzle 120, in response to changes in the parameters of the liquid being processed therethrough. If the pressure of the production water changes for some reason, the stem 80 automatically moves axially as a function of the differential pressure between the spring force and the different liquid pressure. This is allowed by the vertical or axial movement of the stem 80 and the corresponding axial movement of the gear 130 with respect to the motor gear 128, the latter of which remains axially stationary. The relative axial movement between the gear 130 and the motor gear 128 is allowed because such gears are constructed as straight-tooth spur gears.

The expansion nozzle 120 includes a locking mechanism 134 which is effective to lock the idler gear 132 against rotation, or allow the idler gear 132 to rotate with the stem 80. The locking mechanism 134 can be constructed in many different forms, including a solenoid having a plunger that engages with the peripheral teeth of the idler gear 132 to arrest rotation thereof. The idler gear 132 can be coupled to a clutch, either of mechanical or magnetic design, to engage and disengage so as to control the rotation of the idler gear 132. The idler gear 132 rests on a thrust bearing 136 to promote rotation of the idler gear 132 when not locked by the locking mechanism 134.

In accordance with an important feature of the invention, the expansion nozzle 120 is adapted to remove particulate matter, accumulated residue or deposits located in the orifice 78 or on the orifice surfaces. As noted above, the flashing of the high temperature, high pressure production water often produces accumulations of material that adhere to the orifice surfaces. This accumulated matter cannot generally be removed by the opening and closing of the orifice 78 by axial movement of the stem 80. With the arrangement illustrated in FIG. 5, the orifice 78 can be closed by upward movement of the stem 80, or by reducing the pressure of the production water, and then the stem 80 can be rotated to lap the orifice surfaces and remove any residue that has accumulated thereon.

The lapping of the orifice surfaces is carried out in the following manner. First, the stem 80 is moved upwardly so that the ceramic ball 82 is brought into contact with the annular edge 76 of the fitting 70. As noted above, the upward movement of the stem 80 can be occasioned by either reducing or removing the pressure of the production water coupled to the expansion nozzle 65, or by rotating the motor 124 in a specified direction with the idler gear 132 locked. Once the ceramic ball 82 is brought into contact with the annular seat 76, the motor 124 is again energized in either direction, with the idler gear 132 unlocked, so that the stem 80 is rotated without any corresponding axial movement thereof. This action causes the ceramic ball 82 to rotate in contact with the stationary annular seat 76 of the fitting 70, thereby removing any residue on either the ceramic ball 82 or the annular seat 76. After a sufficient number of rotations of the stem 80 has been achieved to clean the orifice surfaces, the expansion nozzle 65 can be returned to operation by activating the locking mechanism 134 and the motor 124 to place the stem 80 at a specified axial location to set the orifice 78 to the desired area, if needed.

Importantly, the production water can be periodically coupled to the expansion nozzle 65 during the lapping operation so that the pressurized water washes the lapped residue away from the orifice surfaces. The advantage of the lapping operation is that the system need only be interrupted briefly without any dismantling of the components thereof. Indeed, those skilled in the art may find that the nozzle lapping operation can be carried out in a manner that is transparent to the operation of the system. In other words, the pressure and temperature of the production water coupled to the expansion nozzle 65 can remain the same during the nozzle lapping operation, and can even be processor controlled so that no human intervention is necessary. In this event, a relief valve (not shown) can be employed during closing of the expansion nozzle orifice 78 to relieve the pressure of the production water for recirculation back to the input of the water purification system. The DC motor 124 and the locking mechanism 134 can be controlled by a programmed processor so that periodically, such as every twenty four hours, the DC motor 124 and the locking mechanism 134 (and any relief valve employed) is controlled to cause automatic lapping of the orifice surfaces and reconstitute the same.

In this and the other embodiments to be described below, it may be desired to control the nozzle 120 during dynamic operation thereof so that the stem 80 continuously rotates, such as at a rate of one rpm, to provide a relative rotational movement between the orifice surfaces 76 and 82. This relative rotational movement between the orifice surfaces 76 and 82 is effective to grind and abrade particles lodged therebetween and cause such particles to pass through the orifice. This function is carried out by rotating the stem 80 while the idler gear 132 is unlocked, so that the compression force of the spring 98 remains unchanged. This feature thus facilitates the self-cleaning function of the nozzles of the invention.

Figure 6:
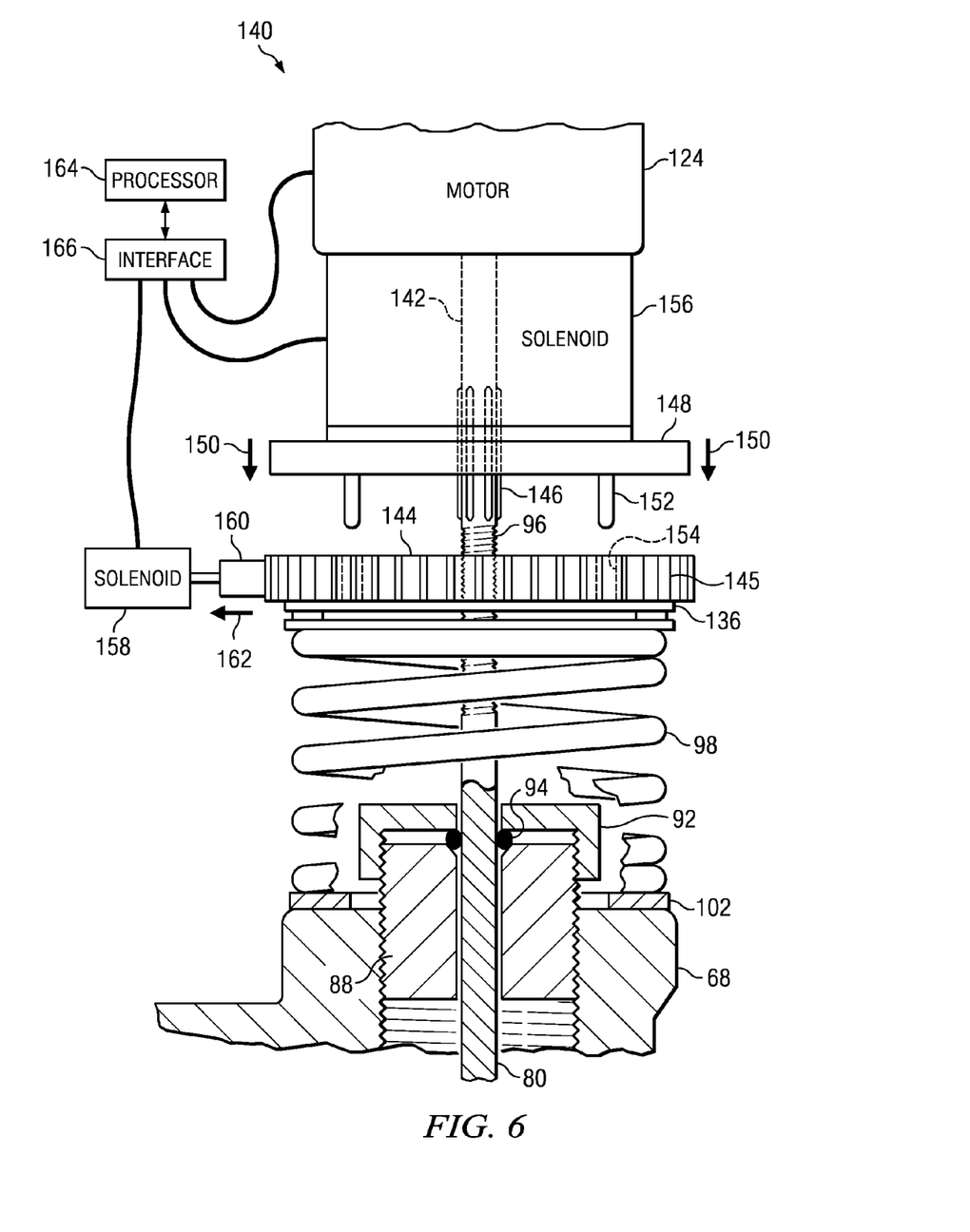
FIG. 6 is an embodiment of the expansion nozzle adjustment mechanism employing a solenoid to lock and unlock the idler gear to allow spring compression adjustments and to allow the nozzle surfaces to be lapped and cleaned.

FIG. 6 illustrates yet another embodiment of an expansion nozzle 140 constructed according to the invention. Here, the DC motor 124 includes a motor shaft 142 that is coupled by suitable means to the top of the stem 80. The coupling is preferably of a telescopic type so that the stem 80 can move axially with respect to the motor shaft 142 during axial movements of the stem 80 to maintain a constant pressure of the production water. The coupling can be male/female splined connection or other suitable telescopic coupling. The top portion of the stem 80 is threaded in the same manner noted above for engagement with the threaded bore of an idler gear 144. In addition, the motor shaft 142 is splined 146 for axial movement thereon of a mechanical clutch plate 148. The clutch plate 148 moves in the direction of arrows 150 for engagement with the idler gear 144. Formed on the bottom of the clutch plate 148 are one or more pins 152 that engage with respective holes 154 formed in the idler gear 144 as the clutch plate 148 is lowered. A solenoid 156 is fastened to the motor 124 and includes a cylindrical plunger (not shown) that is attached to the clutch plate 148. When not energized, the cylindrical plunger is withdrawn into the body of the solenoid 156 by a spring (not shown) so that the pins 152 of the clutch plate 148 are withdrawn from the holes 154 in the idler gear 144. As noted above, when the solenoid 156 is energized, the clutch plate 148 is forced downwardly in the figure, whereupon the pins 152 become engaged within the holes 154 of the idler gear 144.

A second solenoid 158 is provided to lock the idler gear 144 against rotation. The solenoid 158 includes a plunger to which a toothed block 160 is fastened. The teeth of the block 160 engage with the peripheral teeth 145 of the idler gear 144 and prevent rotation of the idler gear 144. When not activated, the plunger of the solenoid 158 is extended so that the toothed block 160 engages the idler gear 144 to prevent rotation thereof. When energized, the plunger of the solenoid 158 is withdrawn in the direction of arrow 162 so that the idler gear 144 is free to rotate.

The DC motor 124 and the solenoids 156 and 158 are controlled by a programmed processor 164. The processor 164 provides signals to an interface 166 to provide the appropriate electrical drive signals to the electrical equipment of the water purification system, including the expansion nozzle 140. While not shown, the top portion of the expansion nozzle 140 can be covered and sealed with an enclosure cap, not shown. The enclosure prevents the various liquids and particulate matter within the expansion chamber 18 from clogging and otherwise disturbing operation of the electromechanical equipment of the expansion nozzle 140. A lubricating oil can be injected within the sealed enclosure of the expansion nozzle 140 to maintain the various mechanical components thereof lubricated.

In operation of the expansion nozzle 140, when it is desired to axially adjust the stem 80 and adjust the static compression force of the spring 98, the solenoids 156 and 158 are not energized. In other words, the clutch plate 148 remains in its upward position, and the toothed block 160 remains engaged with the idler gear 144 to prevent rotation thereof. The motor 124 is then energized to rotate the motor shaft 142 which, in turn, rotates the stem 80. Since the stem 80 is threadably engaged with the idler gear 144 (which remains stationary), the stem 80 moves up or down depending on the direction of rotation of the motor shaft 142. The rotation of the stem 80 effectively compresses the spring 98 more, or reduces the compression of the spring 98. The degree of compression of the spring 98 relates to the degree that the ceramic ball 82 moves away from the seat 76, as a function of the pressure of the production water coupled to the expansion nozzle 140. As can be appreciated, physical access to the expansion nozzle is not necessary. Rather, the processor 164 causes the electrical signals to be coupled to the electrical apparatus to control the same. It should be noted that the water purification system 10 includes a manual control panel (not shown) so that an operator can place the processor 164 in a manual mode and manually control the various processes of the system 10, including the motors and solenoids of the expansion nozzle 140.

When it is desired to lap the orifice surfaces to remove any residue or deposits therefrom as a result of the flash expansion of the high pressure, high temperature production water, then the processor 164 can automatically control the electrical apparatus in the following manner. The solenoid 156 is energized so that the clutch plate 148 is forced downwardly in the direction of arrows 150. The pins 152 thus bear against the top surface of the idler gear 144, and then eventually drop into the holes 154. The solenoid 158 is energized so that the toothed block 160 is withdrawn in the direction of arrow 162. The idler gear 144 is thus free to rotate. The DC motor 124 is then energized to rotate the shaft 142, which also rotates the stem 80. Since the clutch plate 148 is splined 146 to the motor shaft 142, the clutch plate 148 rotates with the motor shaft 142. If the pins 152 did not previously lodge within the holes 154 of the idler gear 144, the initial relative rotation between the clutch plate 148 and the idler gear 144 will eventually cause engagement between the pins 152 and the holes 154. When engaged, the idler gear 144 is driven by the clutch plate 148 via the pins 152. Thus, the stem 80 rotates without any axial movement thereof. With the pressure of the production water relieved, the spring 98 will cause the ceramic ball 82 to engage the seat 76 of the fitting 70. The direct contact therebetween and with the rotation of the ceramic ball 82, any deposits or residue accumulated on the orifice surfaces will be removed. The spring 98 will maintain a pressure between ceramic ball 82 and the annular seat 76.

Indeed, the electrical apparatus of the expansion nozzle 140 can be controlled before the lapping process begins to assure that the spring 98 is sufficiently compressed to increase the lapping pressure to remove hardened residue on the orifice surfaces. Once the lapping process is completed, the expansion nozzle 140 can be returned to service by removing the energization of the solenoids 156 and 158, and returning the spring tension back to the desired compression force. The exact position of the motor shaft 142 can be more accurately controlled by using a stepper motor, and pulsing the motor with pulses generated by the processor 164. In other words, when the spring compression force is initially determined to achieve the desired orifice spacing as a function of the pressure of the production water, then any rotational movements thereafter can be noted so that it is easy to return the force of the compressed spring to its original and desired state. Alternatively, the compression force of the spring 98 can be adjusted by noting the pressure at the output of the high pressure pump 12, and adjusting the spring 98 until the desired system pressure is achieved.

Figure 7:
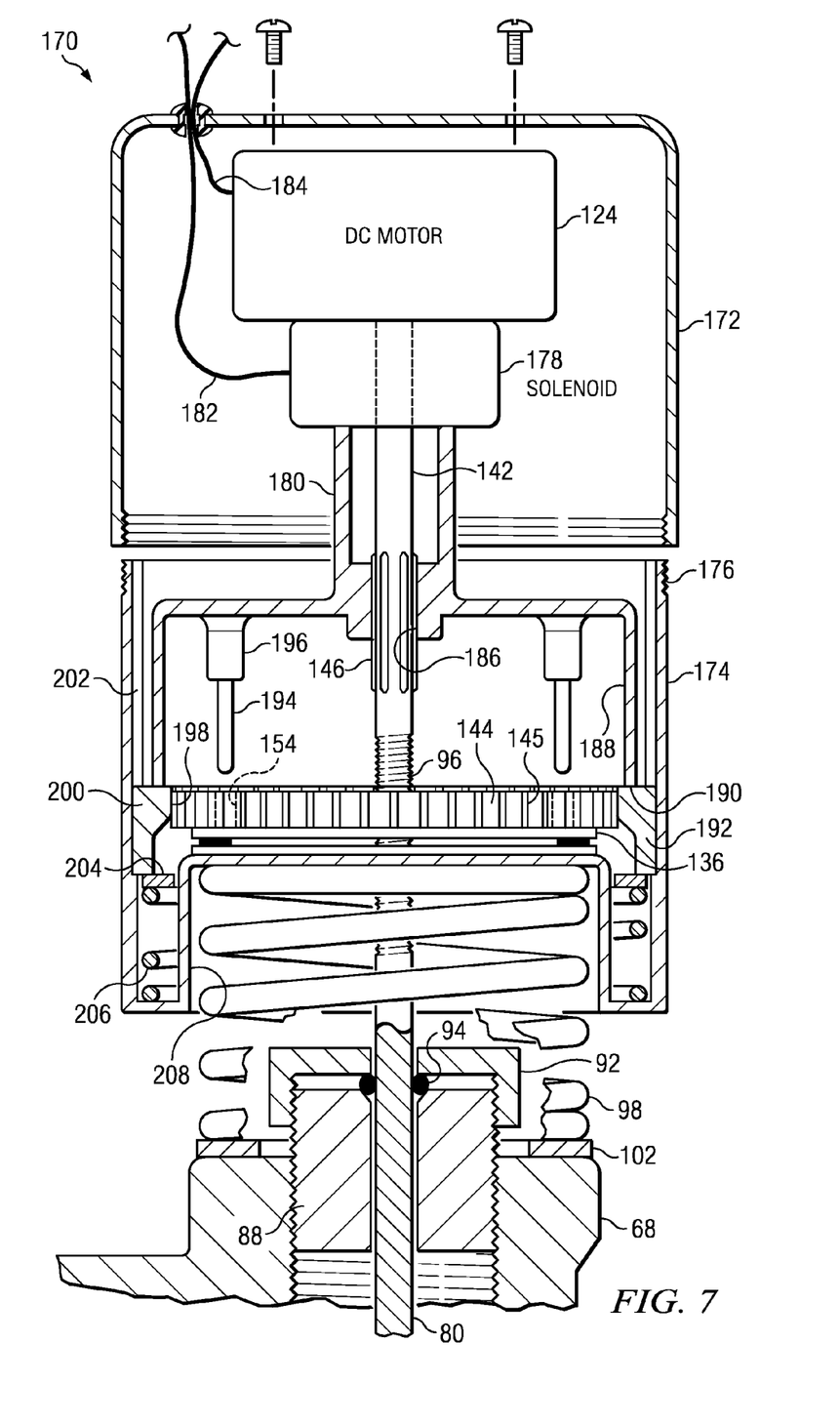
FIG. 7 is an embodiment of the expansion nozzle illustrating another adjustment mechanism for adjusting the spring compression and for lapping the nozzle surfaces, where the idler gear is shown locked.

FIG. 7 illustrates another embodiment of an expansion nozzle 170 constructed according to the invention. The nozzle adjustment mechanism is shown enclosed to protect the components from the harsh environment inside the expansion chamber 18. A container top 172 is threadably fastened to a container bottom 174 by way of threads 176. The container bottom 174 is attached to the compression spring 98 in the manner described below. If desired, the container top 172 and bottom 174 can be sealed so that a lubricating oil can be placed therein. In this embodiment, only a single solenoid 178 is employed to both unlock the idler gear 144, and to engage the idler gear 144 and cause rotation of the same during lapping of the nozzle surfaces.

The solenoid 178 is preferably fastened to the DC motor 124 so that the motor shaft 142 extends through the solenoid 178. The motor shaft 142 is fastened to the stem 80 by any suitable telescopic coupling means. The motor shaft includes splines 146. The solenoid 178 includes a cylindrical plunger 180 that moves axially in response to electrical actuation of a coil (not shown). The solenoid 178 is preferably of the type that includes an internal spring that maintains the plunger 180 withdrawn in the core of the solenoid body when the coil is not electrically energized. The solenoid wires 182 and the wires 184 of the DC motor 124 exit the top of the container top 172 via a grommet or other means to seal the electrical conductors to the container top 172. The solenoid plunger 180 includes an internally splined bore mating with the splines 146 of the motor shaft 142. Thus, the solenoid plunger 180 rotates when the motor shaft 142 rotates. The bottom portion of the solenoid plunger 180 includes a cylindrical plunger envelope 188 having a bottom annular edge 190 that engages with the top annular edge of a cylindrical-shaped idler gear lock ring 192. As will be described below, the downward movement of the solenoid plunger envelope 188 causes the spring-biased idler gear lock ring 192 to move downwardly and unlock the idler gear 144 and allow rotational movement thereof. While not shown, a thrust bearing can be used between the bottom edge 190 of the solenoid plunger envelope 188 and the top of the idler gear lock ring 192 to allow easy relative rotation therebetween. The solenoid plunger envelope 188 has attached thereto a number of spring-loaded pins 194 that depend downwardly, as shown. The pins 194 can be forced at least partially into respective spring housings 196 in the event they are not initially aligned with the respective holes 154 in the idler gear 144.

When the solenoid 178 is electrically energized, the plunger 180 is forced downwardly, which causes two corresponding actions to occur simultaneously. First, the downward movement of the solenoid plunger 180 moves the solenoid plunger envelope 188 downwardly also. This downward movement causes the pins 194 to engage within the holes 154 of the idler gear 144. The downward movement of the solenoid plunger envelope 188 also causes the downward movement of the idler gear lock ring 192. The inner annular surface of the idler gear lock ring 192 includes gear teeth 198 that mesh with the gear teeth 145 around the circumference of the idler gear 144. Moreover, the idler gear lock ring 192 is axially movable up and down by means of a number of ridges or keys thereon that engage within respective vertical slots 202 formed in the inner sidewall of the container bottom 174. In this manner, the idler gear lock ring 192 can move axially in a vertical direction but is prevented from rotating.

The bottom annular edge of the idler gear lock ring 192 rests on a washer 204 which, in turn, rests on the top of a spring 206. The washer 204 and the spring 206 are nestled in a annular-shaped portion of the container bottom 174. The bottom of the container bottom 174 is cup-shaped inwardly to allow the nozzle compression spring 98 to protrude therein so that the container bottom 174 rests thereon. The cupped portion of the container bottom 174 is shown by reference numeral 208. The idler gear 144 rests on a thrust bearing 136 which, in turn, rests on the top of the cupped portion 208 of the container bottom 174. As noted above, the central bore of the idler gear 144 is threadably engaged with the threaded part 96 of the nozzle stem 80 so that rotation of the stem 80 in one direction is effective to move the idler gear 144 downwardly to increase the static compression force of the nozzle spring 98. Rotation of the stem 80 in the other direction by the DC motor 124 is effective to move the idler gear 144 upwardly and reduce the static compression force exerted by the spring 98.

In operation, when it is desired to increase the compression force of the nozzle spring 98, all that is necessary is to energize the DC motor 124 so that the motor shaft 142, and thus the stem 80, moves in a direction such that the idler gear 144 moves axially downwardly (without rotating) and compresses the nozzle spring 98. This effectively reduces the flow rate of the production water through the orifice 78. In the event it is desired to reduce the compression force of the nozzle spring 98, the DC motor 124 is simply energized to rotate the motor shaft 142 in the opposite direction. The DC motor 124 is reversed by controlling the computer interface 166 (FIG. 6) to reverse the DC current through the DC motor 142.

Figure 8:
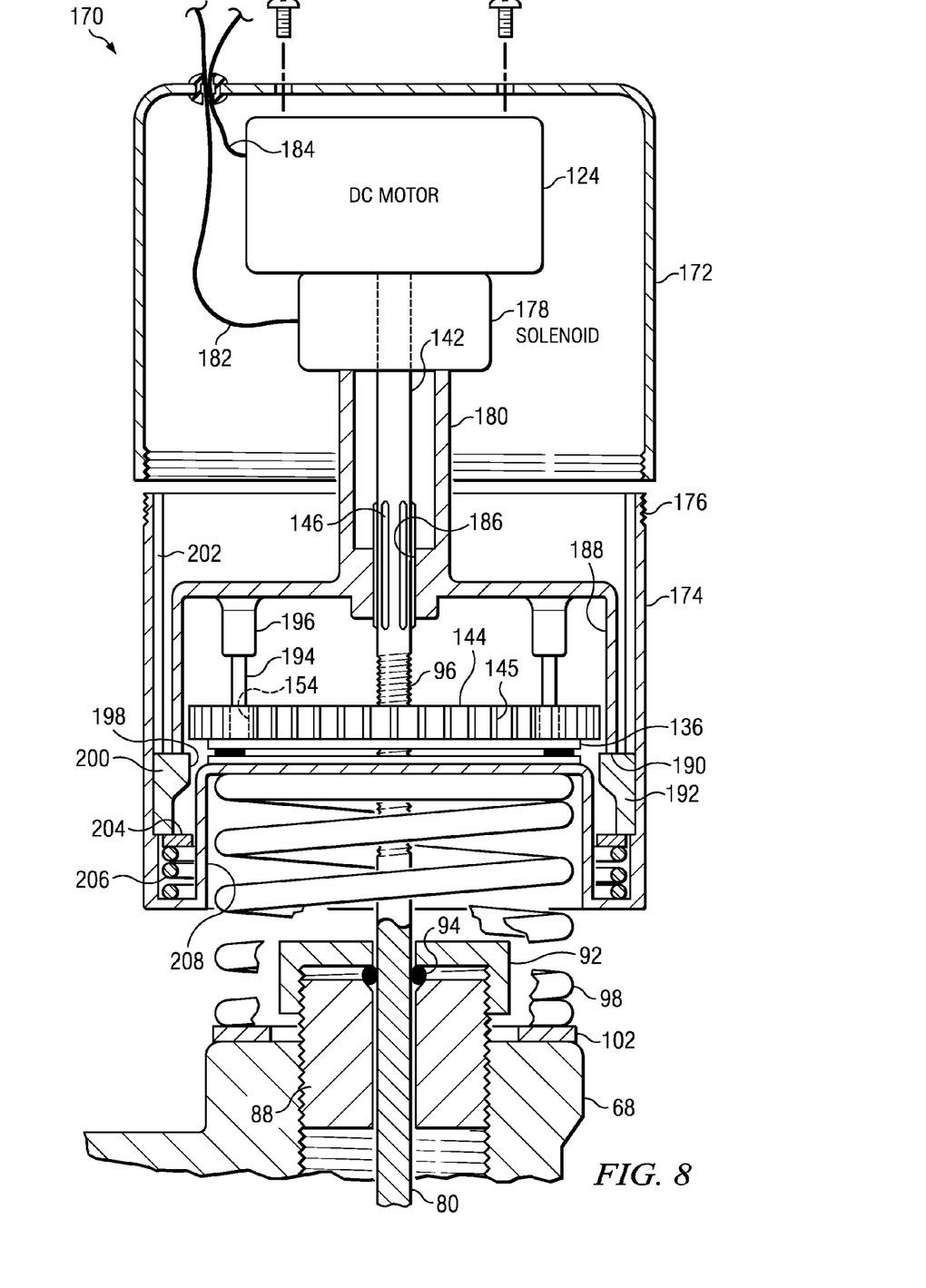
FIG. 8 illustrates the expansion nozzle of FIG. 7, with the idler gear unlocked so that the nozzle surfaces can be lapped without disturbing the compression of the spring.

The state of the expansion nozzle 170 during the nozzle lapping process is shown in FIG. 8. Initially, it is preferred that the pressure of the production water be reduced so that the orifice 78 between the ceramic ball 82 and the annular seat 76 closes. When it is desired to lap the nozzle surfaces, which include that part of the ceramic ball surface that engages the annular seat 76, then the solenoid 178 is energized first, and then the DC motor 124 is energized. When the solenoid 178 is energized, the solenoid plunger 180 is forced downwardly so that the pins 194 either engage within the respective holes 154 of the idler gear, or the pins 194 engage the top of the idler gear 144. The downward movement of the solenoid plunger 180 also causes the solenoid plunger envelope 188 to push the idler gear lock ring 192 downwardly out of engagement with the idler gear 144. When unlocked, the idler gear 144 is free to rotate. The DC motor 124 is then energized, in either direction, so that the motor shaft 142 and the nozzle stem 80 rotate. The rotation of the motor shaft 142 causes corresponding rotation of the solenoid plunger 180. The rotation of the solenoid plunger 180 causes the pins 194 to engage within the respective holes 154 of the idler gear 144 if they were not already engaged therein. Once the pins 194 are engaged with the idler gear 144, the idler gear 144 rotates in unison with the DC motor shaft 142. Thus, during the lapping process, the compression of the nozzle compression spring 98 does not change. The solenoid 178 and the DC motor 124 can continue to be energized to cause rotation of the ceramic ball 82 against the seat 76 and remove any residue therebetween. Once the orifice surfaces have been cleaned, the solenoid 178 and the DC motor 124 can be de-energized so that the water purification process can resume.

During the processing of the production water by the system 10, the expansion nozzle 20 can be changed to accommodate various situations. For example, if a particle is determined to be lodged in the orifice 78 of the expansion nozzle 20, then in order to remove the particle, the nozzle 20 can be momentarily closed in order to crush the particle between the ceramic ball 82 and the seat 76. As an alternative, or in addition thereto, the stem 80 can be rotated by the motor 124 in an attempt to grind and pulverize the particle lodged in the orifice. Indeed, during normal operations of the water purification system 10, the plunge plunger rod 80 of the nozzle 20 can be rotated to prevent lodging of particles in the orifice 78. When the seat 76 of the nozzle 20 remains stationary and the stem 80 rotates, any particles lodged in the orifice 78 tend to be abraded or worn down by the movement of the ceramic ball 82. In order to enhance the pulverizing of particulate matter lodged in the orifice 78, one or both orifice surfaces can be roughened, by fine serrations, a grit adhered to the orifice surfaces, or other suitable roughening means. The high pressure of the production water flowing through the orifice tends to further force the particle in the orifice, thereby facilitating the abrading and removal of the particle through the orifice.

In the various embodiments of the expansion nozzle described above, various features have been shown and enumerated. It is to be understood that the different features can be employed in the different embodiments, and are not limited to the embodiment associated therewith. Those skilled in the art may find it advantageous to modify the features, or add other features to the expansion nozzles described. For example, the pin engagement with the idler gear can be replaced with a magnetic clutch. The pin arrangement with the idler gear can be replaced with a mating tooth engagement or other male/female engagement mechanism. The arrangement of components of the expansion nozzle can be changed so that some of the components are outside of the expansion chamber and the other components are inside to remove the various components from the harsh environment inside the expansion chamber. The DC motor employed in the preferred embodiment can be replaced with a reversible AC motor, or a stepper motor. In the embodiments described above, the stem extends through the body of the nozzle so that the axial movement thereof is controlled from one end of the nozzle to control the orifice located on the other end of the nozzle body. However, the principles and concepts of the invention can be employed by controlling the movement of a nozzle stopper, all at the same end of the body of the nozzle without having to extend a stem through the body of the nozzle.

Thus, while the preferred and other embodiments of the invention have been disclosed with reference to specific expansion nozzles and associated equipment, and associated methods of operation thereof, it is to be understood that many changes in detail may be made as a matter of engineering choices without departing from the spirit and scope of the invention, as defined by the appended claims.

What is claimed is:

1. A variable orifice nozzle for use with a pressurized liquid, comprising:
a nozzle body having an inlet into which the pressurized liquid is admitted, and an outlet opening through which the pressurized liquid exits;
a threaded shank;
a stem that is movable with respect to said outlet opening of said nozzle body to form an orifice, said stem connected to said threaded shank;
a spring biasing said stem toward a position closing the orifice, and said spring having a force counteracted by a pressure of the liquid during dynamic operation of the nozzle to change an orifice area to maintain a desired pressure of the liquid applied to the inlet of said nozzle body;
a member threadably engaged with said threaded shank, wherein relative rotation between said threaded shank and said member is adapted for changing a compression force of said spring; and
a drive mechanism for applying a desired compression force to said spring.

2. The variable orifice nozzle of claim 1, wherein said spring is adapted to allow the stem to move and thereby increase the orifice area in response to increased liquid pressure, and move the stem to decrease the orifice area in response to decreased liquid pressure.

3. The variable orifice nozzle of claim 1, wherein said drive mechanism is adapted for rotating said stem to thereby move said member axially with respect to said stem and apply a desired compression force to said spring.

4. The variable orifice nozzle of claim 3, wherein said member comprises an idler gear with peripheral teeth.

5. The variable orifice nozzle of claim 3, further including a movable lock mechanism engageable with said member, said lock mechanism movable to a first position to engage with said member to prevent rotation of said member, and said lock mechanism movable to a second position disengaged from said member to thereby allow said member to rotate.

6. The variable orifice nozzle of claim 5, wherein said lock mechanism is movable radially with respect to said member.

7. The variable orifice nozzle of claim 5, wherein said lock mechanism is movable axially with respect to said member.

8. The variable orifice nozzle of claim 5, further including a clutch mechanism rotatable with said stem and movable into engagement with said member to rotate said member when said lock mechanism is disengaged from said member.

9. The variable orifice nozzle of claim 8, wherein said clutch mechanism includes at least one pin movable into a respective hole in said member so that said stem and said member rotate in unison.

10. The variable orifice nozzle of claim 8, further including a solenoid for moving said clutch mechanism into engagement with said member.

11. The variable orifice nozzle of claim 10, wherein said clutch mechanism is splined to said stem.

12. The variable orifice nozzle of claim 1, further including a programmed processor for controlling said drive mechanism.

13. The variable orifice nozzle of claim 12, wherein said drive mechanism comprises a motor.

14. The variable orifice nozzle of claim 12, wherein said processor is programmed to rotate said stem when said orifice is closed to thereby lap orifice surfaces and clean the same.

15. The variable orifice nozzle of claim 12, wherein said processor is programmed to cause rotation of said stem during dynamic operation of said nozzle to thereby remove particulate matter lodged in said orifice.

16. The variable orifice nozzle of claim 1, wherein said drive mechanism is electrically operated to apply a desired compression force to said spring during dynamic operation of said nozzle.

17. A variable orifice nozzle for use with a pressurized liquid, comprising:
a nozzle body having an inlet into which the pressurized liquid is admitted, and an outlet opening through which the pressurized liquid exits;
a stem having a member attached thereto, said member movable to form a variable area orifice with the outlet opening of said nozzle body, said stem having a threaded portion;
a spring biasing said stem to a position closing the orifice, and a force exerted by said spring on said stem defining an orifice area during dynamic operation of the nozzle;
a rotatable member that is engageable with said stem and movable axially with respect to an axial axis of said stem, said rotatable member adapted for applying desired compression forces to said spring, and said rotatable member having a threaded bore mating with the threaded portion of said stem;
a lock mechanism movable into and out of engagement with said rotatable member;
a first electrical drive mechanism for rotating said stem; and
a second electrical drive mechanism for moving said lock mechanism.

18. The variable orifice nozzle of claim 17, further including a programmed processor controlling said first and second electrical drive mechanisms to cause said stem to rotate and said lock mechanism to become disengaged from said rotatable member and thereby rotate said stem without changing an orifice area of said nozzle.

19. A method of processing a pressurized liquid, comprising:
pumping a heated liquid through a liquid processing system, where the temperature of the liquid is sufficient to flash the heated liquid when exiting a nozzle;
using a spring to bias a stem member that moves and forms a variable size orifice in the nozzle, where a compression force of the spring defines the pressure at which the heated liquid is pumped through the orifice of the nozzle; and
sensing the liquid pressure in the liquid processing system by a control system, and changing the compression force of the spring to thus change the pressure by which the liquid is pumped in the liquid processing system.

20. A method of using a variable orifice nozzle in a system processing a pressurized liquid that includes water, comprising:
using a variable orifice nozzle of the type in which a spring biased member moves in response to pressurized liquid, said pressurized liquid overcomes a force of the spring and moves the member to form an orifice in said nozzle, and a size of said orifice is dependent on the pressure of said pressurized liquid;
pumping a heated liquid under pressure into the variable orifice nozzle to cause the spring biased member to move and form said orifice in said nozzle;
allowing the spring to move the spring biased member and reduce the size of the orifice in response to reductions of pressure of the heated liquid to thereby maintain a desired pressure of the heated liquid;
allowing the spring to move the spring biased member and increase the size of the orifice in response to increases in the pressure of the heated liquid to thereby maintain the desired pressure of the heated liquid; and
flashing at least a portion of the water in the pressurized, heated liquid as the liquid exits the nozzle orifice.

21. The method of claim 20, further including pumping the liquid using a positive displacement pump.

22. The method of claim 20, wherein the spring biased member of the variable orifice nozzle dynamically moves during processing of the liquid to maintain the desired pressure of the liquid.

23. The method of claim 20, further including rotating the spring biased member during dynamic operation of the variable orifice nozzle so that residue is abraded between an enlarged end of said spring biased member and a nozzle seat.

24. A variable orifice nozzle for use with a pressurized liquid, comprising:
a nozzle body having an inlet into which the pressurized liquid is admitted, and an outlet opening through which the pressurized liquid exits;
a stem that is movable with respect to said outlet opening of said nozzle body to form an orifice;
a spring biasing said stem toward a position closing the orifice, and said spring having a force counteracted by a pressure of the liquid during dynamic operation of the nozzle to change the orifice area to maintain a desired pressure of the liquid applied to the inlet of said nozzle body;
a drive mechanism for applying a desired compression force to said spring; and a programmed processor for controlling said drive mechanism, said processor is programmed to rotate said stem when said orifice is closed to thereby lap orifice surfaces and clean the same.

25. A variable orifice nozzle for use with a pressurized liquid, comprising:
 a nozzle body having an inlet into which the pressurized liquid is admitted, and an outlet opening through which the pressurized liquid exits;
 a stem that is movable with respect to said outlet opening of said nozzle body to form an orifice;
 a spring biasing said stem toward a position closing the orifice, and said spring having a force counteracted by a pressure of the liquid during dynamic operation of the nozzle to change the orifice area to maintain a desired pressure of the liquid applied to the inlet of said nozzle body;
 a drive mechanism for applying a desired compression force to said spring; and
 a programmed processor for controlling said drive mechanism, said processor is programmed to cause rotation of said stem during dynamic operation of said nozzle to thereby remove particulate matter lodged in said orifice.

* * * * *